Nov. 15, 1955        C. J. KEIFFER        2,723,725

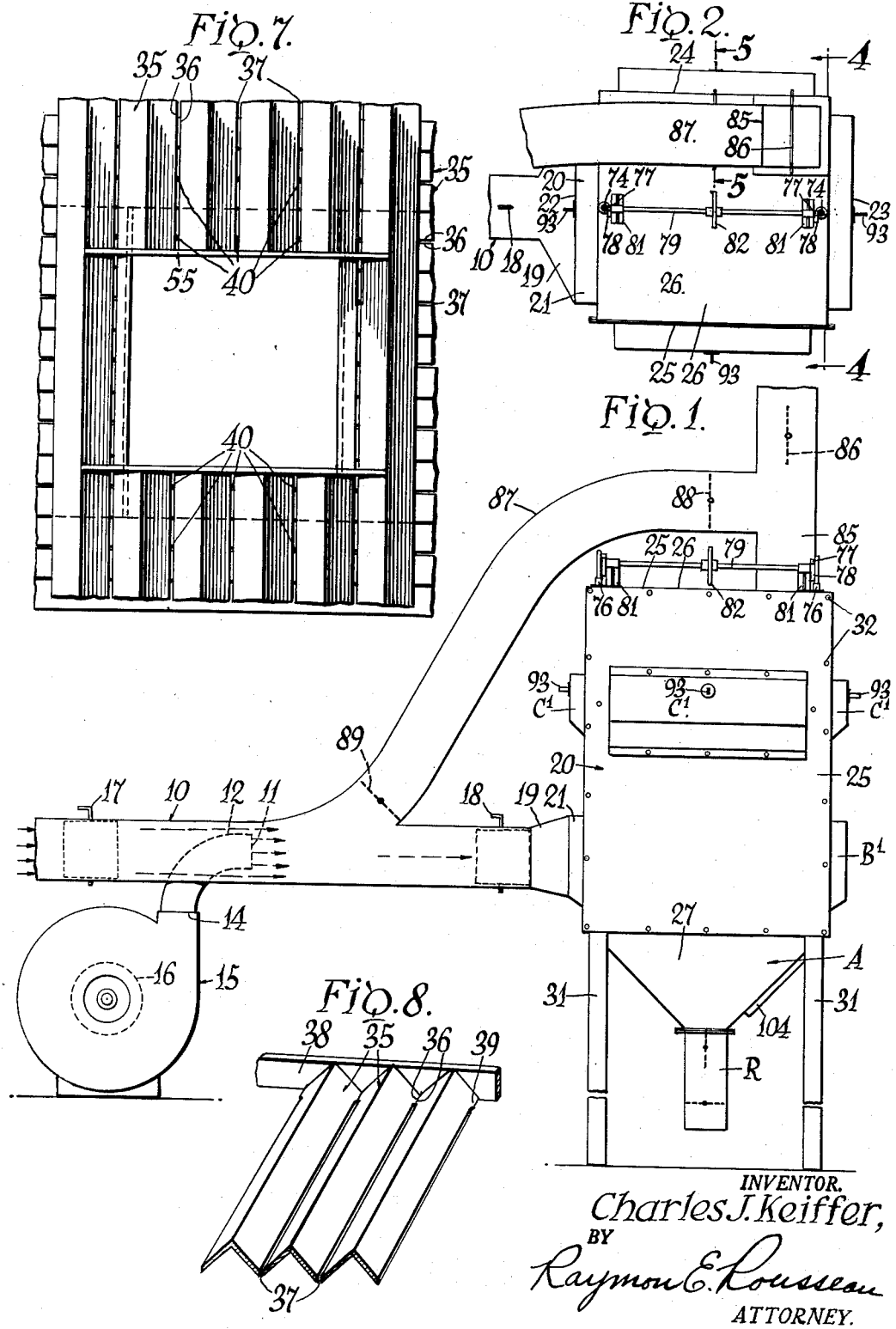

DUST SEPARATING AND RECOVERING APPARATUS

Filed May 18, 1954        5 Sheets-Sheet 2

INVENTOR.
Charles J. Keiffer,
BY
Raymon E. Rousseau
ATTORNEY.

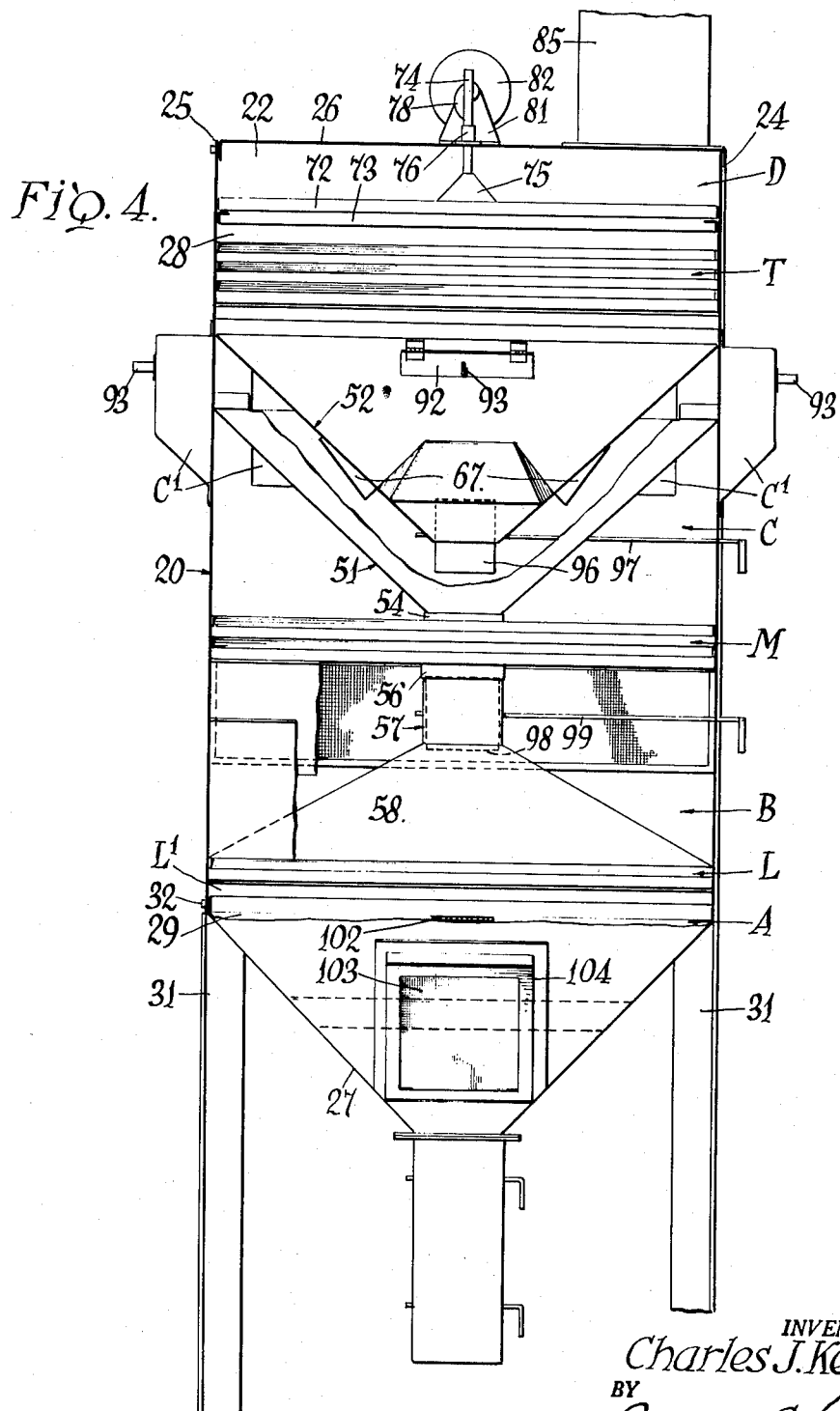

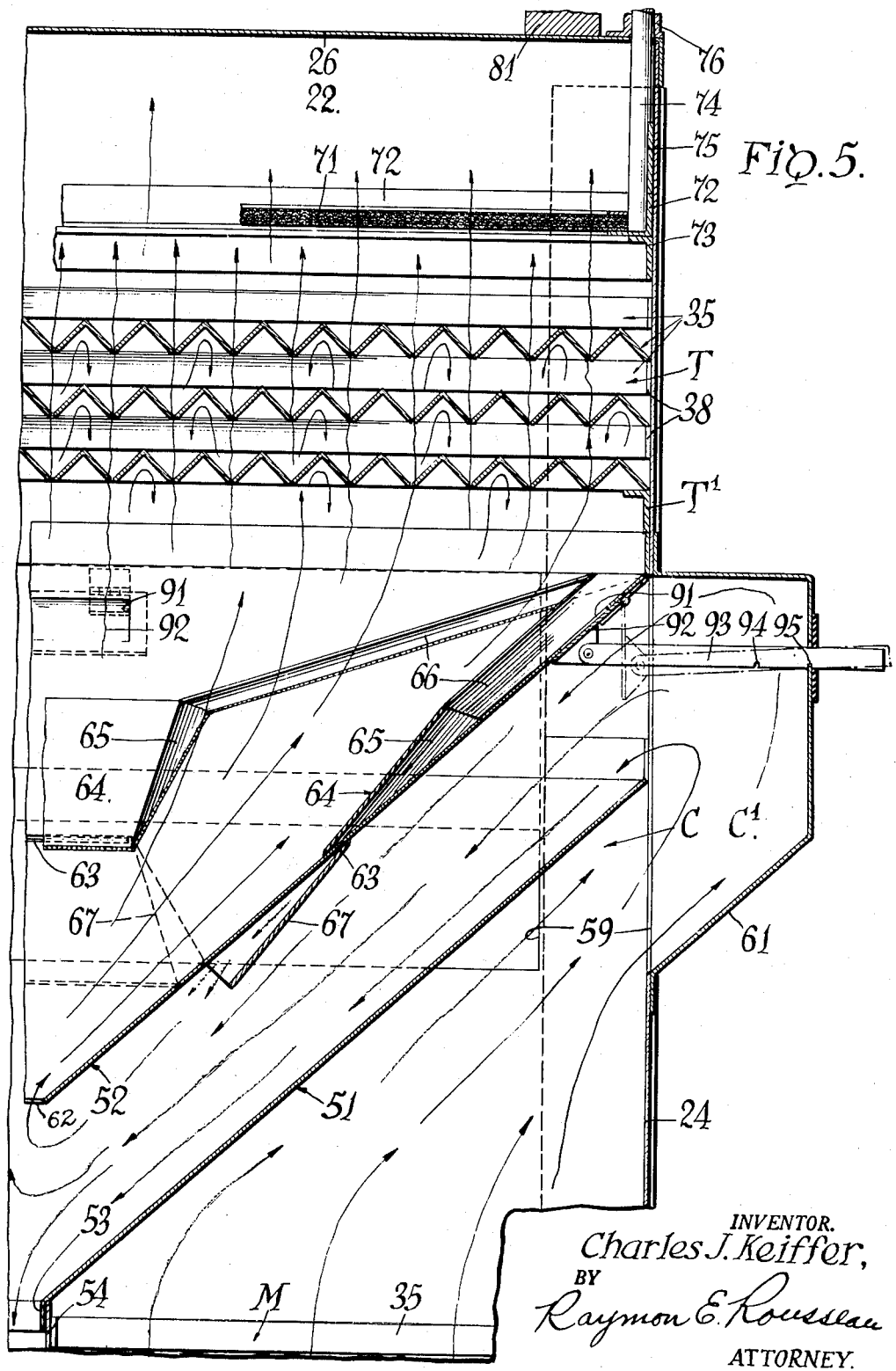

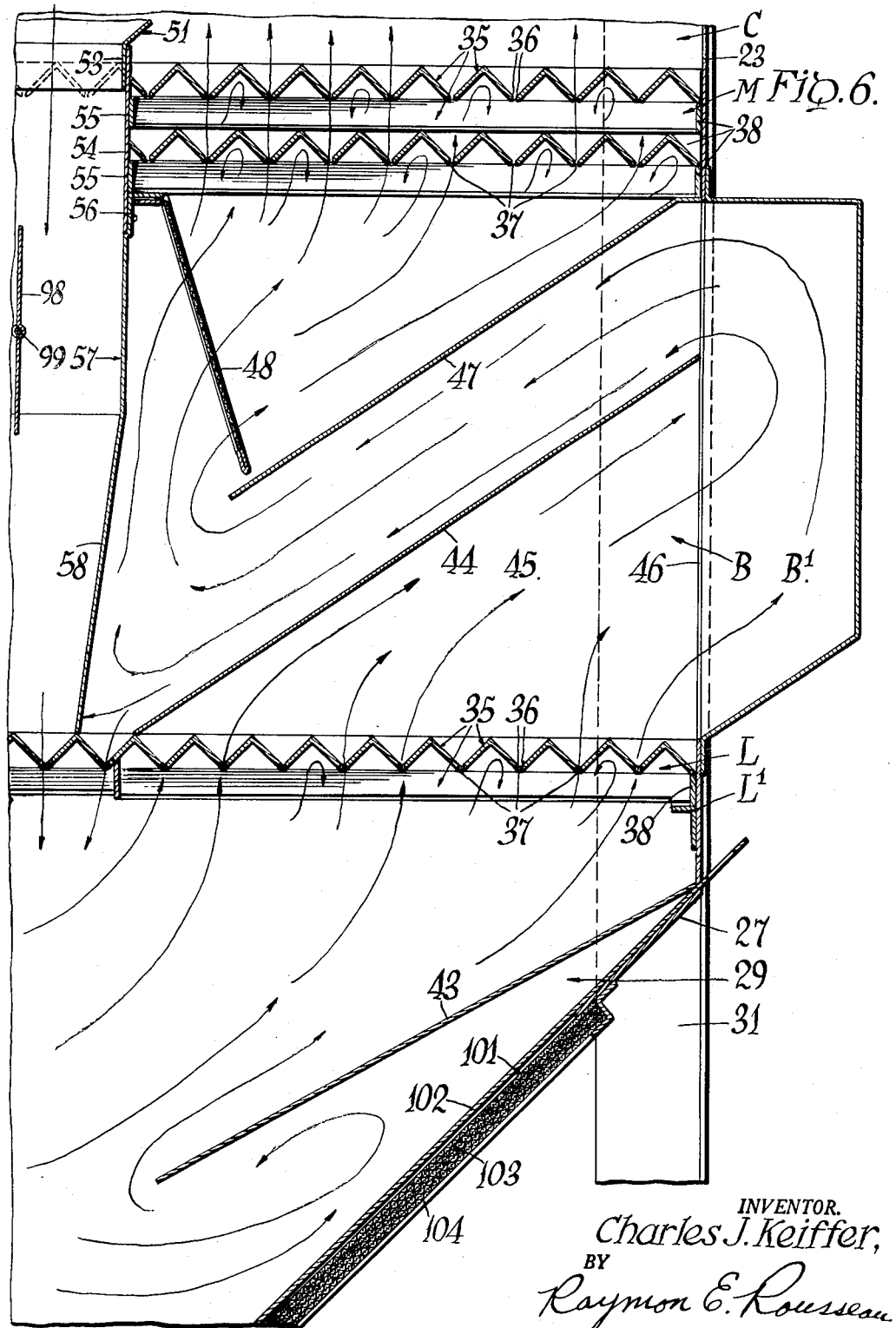

United States Patent Office 2,723,725
Patented Nov. 15, 1955

2,723,725
DUST SEPARATING AND RECOVERING APPARATUS

Charles J. Keiffer, Buffalo, N. Y.

Application May 18, 1954, Serial No. 430,618

10 Claims. (Cl. 183—54)

My invention relates to improvements in apparatus for separating and recovering dust from a stream of dust laden air or gases.

The objects of my invention are to provide an improved dust collecting and recovering apparatus; to provide a chamber of the apparatus with a series of baffle plates, formed and arranged in a manner to cause heated or cool dust laden air or gases entering the chamber adjacent its bottom to follow tortuous paths in passing through a series of graduated baffle screens and wire mesh screens and out the top of the chamber, thereby successively deflecting the flowing air or gases in opposite directions, whereby substantially all of the suspended particles of dust are precipitated from the flowing air or gases; to provide improved forms of baffle plates and baffle screens; to provide the chamber with an internal down-draft conduit arranged to cooperate with certain of the baffles in directing a portion of the flow of air or gases downwardly to remove dust therefrom; to provide the chamber with external conduits and dampers and with internal dampers and doors, said dampers and doors being operable to shut off the flow of dust laden air or gases to the chamber and to direct dust free air downwardly through and out of the chamber in a manner to remove any particles of dust which may have adhered to the interior of the chamber and its component parts; to provide the chamber with a dust collecting receptacle from which the collected dusts may be removed from time to time; to provide means for vibrating the chamber to prevent accumulation of dust in the chamber and on its component parts, and to provide a compact, durable and efficient dust removing and collecting apparatus in which the component parts may be readily assembled and removed for repair or replacement.

In the drawings:

Fig. 1 is a side elevational view of my dust separating and recovering apparatus.

Fig. 2 is a top plan view of the dust separating and recovering chamber of the apparatus shown in Fig. 1.

Fig. 4 is a vertical sectional view taken about on the line 4—4 of Fig. 2, with portions of several of the baffles broken away to more clearly show other component parts of the chamber.

Fig. 5 is an enlarged fragmentary vertical sectional view of the upper portion of the chamber taken about on line 5—5 of Fig. 2, and showing the upper series of baffle plates and baffle screens.

Fig. 6 is an enlarged fragmentary vertical sectional view of the lower portion of the chamber taken in the same plane as Fig. 5 and showing the intermediate series of baffle plates and the intermediate and lower baffle screens.

Fig. 7 is a fragmentary top plan view showing how the center portion of the intermediate screens are constructed to fit around an extension of the lowermost of the upper series of baffles, and Fig. 8 is a fragmentary perspective view showing how the outer ends of a plurality of angle irons are each connected to a bar and may have their side edges relieved to form a baffle screen unit.

Figure 3:
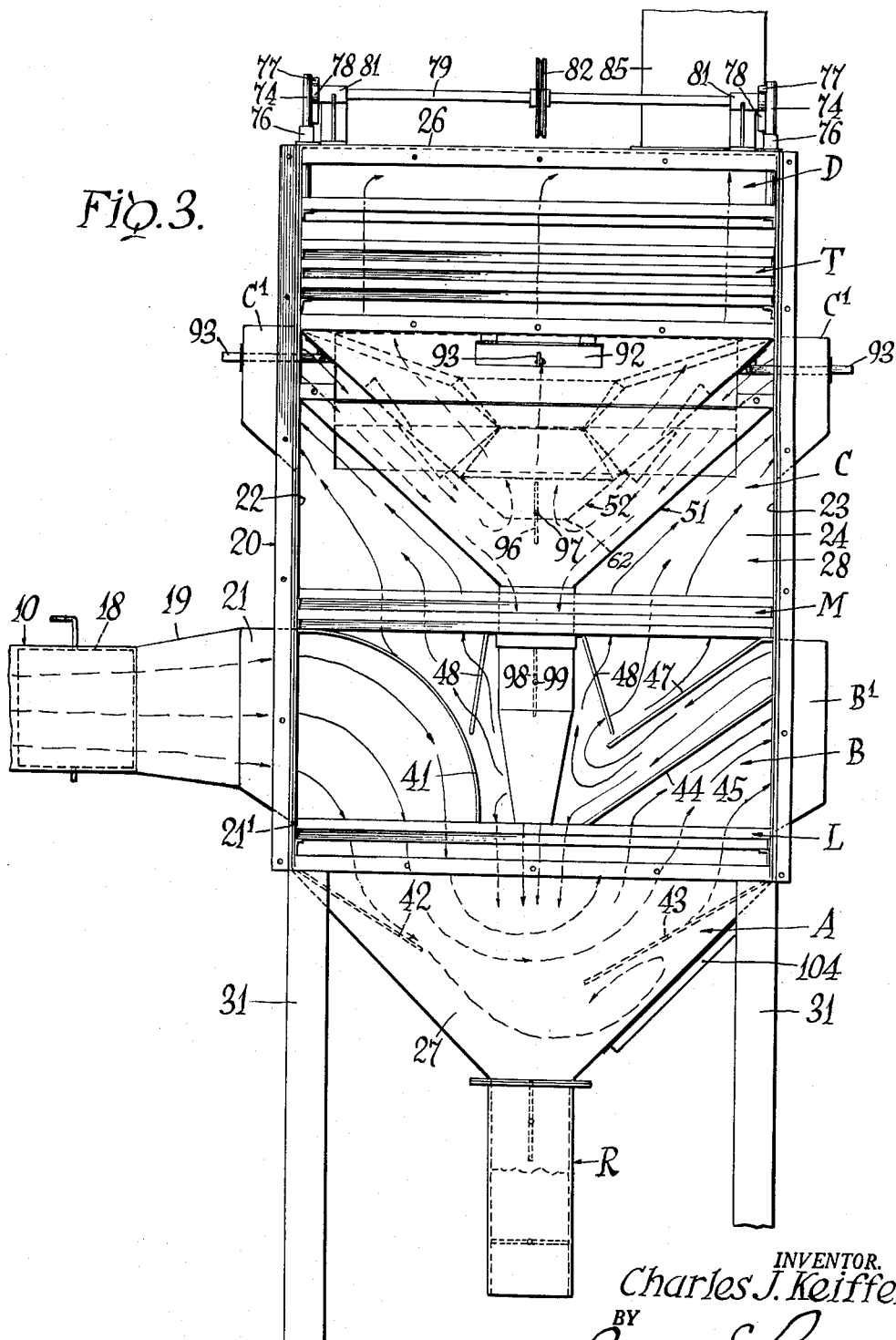
Fig. 3 is an elevational view of the chamber with its cover plate removed to show the general arrangement of the baffles and screens.

In the specific adaptation of my invention shown in the drawings, dust laden gases from a machine such as a cement mill or rotary cement kiln (not shown) flow through a conduit 10. The outlet or nozzle end 11 of a pipe 12 projects into the conduit 10 in the direction of the flow of the gases and its opposite end is connected to the outlet end 14 of an air blower 15 so that when the blower 15 is driven by a motor indicated at 16 air is forced through the nozzle 11 and into the conduit 10 thereby inducing a rapid flow of the gases therethrough.

The conduit 10 is normally open but, for a purpose to be described later, is provided with a pair of dampers 17 and 18 respectively located rearwardly and forwardly of the nozzle 11 and has its forward end connected by an outwardly diverging throat portion 19 to a rectangular collar extension 21 surrounding an opening 21' formed at the lower end of one side wall of a dust separating and recovering chamber generally indicated by the numeral 20.

The body of the chamber 20 is preferably formed of four equally spaced vertical walls 22, 23, 24 and 25, a flat top wall 26 and an inverted pyramidally-shaped bottom wall 27, thus forming a dust separating and recovering chamber having a rectangularly-shaped upper chamber portion 28 and a pyramidally-shaped lower chamber portion 29. An angle iron 31 is secured to each external vertical corner of the receptacle and as shown in Fig. 1, the angles support the receptacle at a suitable elevation.

The receptacle is provided with sundry novel baffle plates, baffle screens, dampers, doors and conventional wire mesh screens to be hereinafter described in detail, and to facilitate the installation and removal of certain of the elements, the wall 25 is detachably secured to the receptacle by bolts 32 in the manner shown in the drawings.

It will be understood that the dust laden gases herein referred to include uncooled as well as heated gases and air and that since the specific weights of the particles of dust carried in suspension in the rapidly flowing stream of gases are not the same, the heavier particles of dust being more readily removable, are removed first and thereafter lighter and lighter particles of dust are removed in successive stages.

To accomplish this successive stage removal of dust particles of different weights from the stream of gases, I prefer to use three spaced groups of multiple baffle screen units and a plurality of baffle plates formed and arranged in the chamber 20 in the following manner: The lower group of screens comprising two screen units, is indicated by the letter "L," the middle group of screens, comprising four screen units, is indicated by the letter "M" and the top group of screens, comprising six screen units, is indicated by the letter "T," and since the total face area of each group of screen units is substantially equal to the transverse area of the chamber 20 they serve to divide it into four separate compartments A, B, C and D.

The baffle screen units of each group of screens are preferably formed of a plurality of inverted V-shaped or angle iron elements 35 arranged with their apices up and their side edges 36 in predeterminately spaced side-by-side relation to provide a desired space or opening 37 therebetween. The elements 35 have their opposite ends rigidly secured to end bars 38 which maintain their predetermined spacing. As shown in Fig. 8 end portions 39 of the elements 35 may be advantageously arranged in touching relation and may have their side edges 36 intermediate their touching end portions 39, relieved more or less to provide different desired openings 37.

As shown in Figs. 5, 6 and 7 the elements 35 of each screen unit of each group are inverted, and cross the elements of a lower unit at right angles thereby forming a multiplicity of square openings 40 (Fig. 7) which extend vertically between the top and bottom screen units. By reason of the formation and arrangement of the screen units of the groups B, M and T and the spacing of their elements 35, each successive group of screens will create a sufficient degree of turbulence in dust laden gases forced upwardly therethrough to cause lighter dust which has gotten by a preceding screen to be precipitated from the flowing gases. It will be apparent that dust cannot readily adhere to the inclined sides of the elements 35 in sufficient quantities to cause blinding, especially when the screens are slightly vibrated in a manner to be described.

Referring now to Fig. 3, the rapidly flowing dust laden gases as indicated by the arrows are forced through the conduit 10, the throat 19, the collar 21 and the opening 21' by the fan 15 and enter the compartment B wherein they are downwardly deflected by a curved baffle plate 41. The baffle plate 41 being extended between the walls 24 and 25 and between the top of the opening 21' in the wall 22 and the top edge of one of the upper elements 35 to overlie approximately 40 per cent of the total area of the screens of group L, deflects all of the dust laden gases through this portion of the screens and into the compartment A. The spacing of the elements of this portion of the screens, being in the order of .125 to .130 inch, causes some precipitation of some of the heavier particles of dust which fall through chamber A and into a suitable dust recovery receptacle R. Upon entering the chamber A, the downwardly moving gases are partially deflected by an inwardly and downwardly inclined baffle plate 42 across the chamber and toward another inwardly and downwardly inclined baffle plate 43 which deflects a portion of the gases downwardly to precipitate more of the heavier particles of dust and which deflects the remaining portion of the stream of gases upwardly toward the wall 23.

The upwardly deflected stream of gases pass through the right hand portion of the screens of group L, and since the spaces between the elements 35 of this portion are in the order of .070 to .100 inch more of the heavier particles of dust are precipitated and fall downwardly, through compartment A and into the receptacle R. The area of this portion of the screens to prevent appreciable back-pressure is about equal to that through which the gases first passed, i. e. approximately 40 per cent of the total area of the screens, and is determined by the extent an inclined baffle plate 44 in compartment B overlies the screens L (Fig. 6). The baffle plate 44 extends transversely between the walls 24 and 25 and upwardly and outwardly from its contact with the screens L to the wall 23, and thus provides a passage 45 through the compartment B and serves to deflect the upwardly flowing gases through the lower portion of an opening 46 (Fig. 6) in the wall 23 and into a box-like compartment which forms an outward extension B' of the compartment B. Upon leaving the compartment B' through the upper portion of the opening 46, the flowing gases are directed inwardly and downwardly into the compartment B by a baffle plate 47, which also extends between the walls 24 and 25, and from the top of the opening 46 inwardly in superposed parallel relation to the baffle 44. The gases now flow downwardly and inwardly between the baffle plates 44 and 47, a portion flowing downwardly, thru the screens L, and the remaining portion flowing upwardly around the lower end of the baffle 47 between and outwardly through a pair of spaced inclined wire mesh screens 48 and upwardly through the group of screens M into the compartment C. Particles of dust in the downwardly flowing portion of the gases together with particles of dust which cannot pass through the wire mesh screens 48 are precipitated downwardly between the inner ends of the baffles 41, 47 and 44 and through the screens L, and the particles of dust which are precipitated by the group of screens M slide downwardly along the baffles 41 and 47, under the lower edges of the screens 48 and also pass through the screens L. The elements 35 of the screens L between which said downwardly flowing portion of the gases and said dust particles pass being spaced, in the order of .500 inch, to allow their passage and to prevent appreciable back-pressure.

The compartment C is provided with a lower inverted truncated pyramidally-shaped baffle plate device 51 and a similarly shaped upper baffle plate device 52 spaced thereabove. The flanged bases of these devices fit within and are secured to the walls 22, 23, 24 and 25 of the compartment C to prevent leakage of gases therebetween, and the truncated end of the lower device 51 is provided with a collar 53 over which a short conduit 54 is slip-fitted. The conduit 54 extends through a framed opening 55 formed in the center of each of the screens of the group M and into the compartment B, as shown in Figs. 6 and 7, and its lower end is slip-fitted into the upper end 56 of another conduit 57, which extends downwardly to and is supported upon the top screen of the group L (Fig. 6). The lower end portion 58 of the conduit 57 is convergingly tapered downwardly as shown in Figs. 3 and 6 to overlie a central area of the screens L located between the baffle plates 41 and 47 and, as best seen in Fig. 4, is divergingly flared downwardly to span the space between the walls 24 and 25 of the compartment B for a purpose to be later described.

The gases, from which the heavier particles of dust have been removed in the above described manner, upon entering the compartment C are deflected upwardly and outwardly by the baffle device 51 through the lower portion of an opening 59 formed in each of the walls 22, 23, 24 and 25 and into box-like extension covers 61, each of which covers its opening 59 and forms an outward extension C' of the compartment C. The gases then flow through the upper portion of the openings 59 and inwardly and downwardly between the baffle devices 51 and 52, toward their truncated open ends. Some of these gases now flow upwardly through the truncated open end 62 of the baffle device 52 and between the elements 35 of the top group of screens T into the compartment D. In passing through the baffle screens of the group T, the elements 35 of which are spaced apart about .040 to .050 inch, substantially all of the lighter particles of dust are precipitated into the baffle device 52. Each plate of the device 52 is formed intermediate its upper and lower edges with a horizontally disposed slot 63 into and through which the particles of dust are directed by an upwardly opening overlying hopper-like hood 64 having its angularly disposed sides 65 extended to the corners of the device by angularly disposed strips 66. A similarly formed downwardly opening hood 67 is secured to the opposite side of each plate and extends in a direction opposite to the hood 64 so that the downward flow of gases between the plates of the devices 51 and 52 and over the hoods 67 induces a downward flow of dust (indicated by short arrows) through the hood 64, the slot 63, the hood 67 and into the downward flow of gases.

Since all of these downwardly flowing gases cannot pass upwardly through the truncated end of the device 52, some of the gases pass downwardly through the conduits 54 and 57 and create a down-draft flow therein which carries the particles of dust collected by the device 51 downwardly through the conduits 54, 57 to the screens L. These dust particles then pass through the screen L, the compartment A and into the receptacle R. The lower end 58 of the conduit 57 as described above, is flared as shown in Fig. 4 to distribute and direct the downwardly flowing dust particles through a relatively narrow center section of the screens L and to insure against back-pressure in the conduits 54 and 57, the side edges of the elements 35 of the screens of group L of this section are spaced to provide openings therebetween in the order of .500 of an inch.

The successive groups of baffle screens L, M and T remove practically all of particles of dust in the air or gases which pass through the successive compartments A, B and C. However, any lighter particles of dust in passing upwardly through the compartment D must pass through a series of increasingly finer mesh wire screens 71 carried by a screen frame 72 slidably fitted in the chamber D for up and down movements (Figs. 3 and 5). The screen frame 72 normally rests on an angle-iron supporting frame 73 and is lifted and dropped upon the frame 73 by any suitable mechanism to jar loose and precipitate from the screens 71 any adhering particles of the lightest dust which falls through the screens of the group T and into the baffle device 52 for removal therefrom in the manner above described. To accomplish this jarring action of the screens 71, two opposite sides of the frame 72 midway between their ends may be each provided, for example, with a rod 74 having its lower end secured thereto and to a gusset plate 75, its medial portion mounted for vertical sliding movements in a bearing 76 secured to the top wall 26 and its upper end provided with a roller 77. Each of the rollers 77 is located to be engaged by one of a pair of cams 78 each of which is secured to one end of a shaft 79 journalled in bearing brackets 81 secured to the top 26, and each of which is formed to engage, then gradually raise, then suddenly drop its roller when the shaft is rotated by a pulley 82 driven from a source of power (not shown). This movement of the roller 77 is transmitted to the frame 72 by the rods 74, and the jarring action which occurs when the frame 72 strikes the frame 73 is sufficient to prevent blinding of the wire mesh screens 71. Since this jarring action is transmitted to the baffle plates and baffle screens it should be sufficient to prevent any appreciable accumulation of dust particles on these elements. However, in the event more action of the baffles and baffle screen is found necessary, the jarring action may be increased or supplemented by vibrating the receptacle 20 by any suitable vibration producing means.

The air or gases from which substantially all of the particles of dust have been removed in the foregoing manner now flwo into and through a conduit 85 to the atmosphere, thus completing the normal cycle of operation of my apparatus.

When it is deemed necessary or desirable to change or replace the groups of baffle screens L, M, T, it will be understood that upon removing the bolts 32 the wall 25 may be removed to expose and provide access to all of the baffle plates and screens, whereupon all six of the baffle screens of the group T, and the two baffle screens of the group L may be removed by being slid forwardly upon their supporting rails T' and L' respectively, or the baffle screen units of each of these groups may be individually removed, and that upon sliding the conduit 57 downwardly out of engagement with the conduit 54 and the conduit 54 downwardly out of engagement with the collar 53 and the four baffle screens of the group M, these baffle screen units which are supported upon the outer edge portions of the baffle plates 47 may also be removed as a group or individually removed.

In the operation of my apparatus under normal conditions practically all of the particles of dust will be precipitated from the flowing gases, and since these dust particles may have some value they are collected in the receptacle R from which they can be removed from time to time.

Under conditions which may not be considered normal it may be possible for some of the dust particles to adhere to the baffle plates and screens. To meet this contingency I prefer to provide my apparatus with means for back-drafting the receptacle 20. Accordingly the conduit 85 is provided with a damper 86 and between this damper and the top wall 26 is connected by a conduit 87 to the conduit 10 between the outlet 11 and the damper 13. The conduit 87 thus establishes communication between the conduit 10 and the conduit 85 but since a pair of dampers 88 and 89 normally close the conduit 87 and the dampers 17, 18, and 86 are normally open, the air or gases will normally flow into and through the receptacle in the manner described above until the normal position of these dampers and other dampers and doors to be described are reversed.

To further provide for back-drafting the receptacle 20 each inclined plate of the device 52 is formed with an opening 91 normally closed by a door 92 which is externally operable by a lever 93, formed with notches 94 and 95 engageable with the outer wall of the associated compartment C' as shown in Fig. 5 in full lines to hold the door closed and in broken lines to hold the door open. The small truncated end of the baffle device 52 is provided with a normally open damper 96 externally operable by a rod 97 and the conduit 57 is provided with a normally open damper 98 externally operable by a rod 99. The inclined wall of the compartment A beneath the baffle plate 43 is provided with a large opening 101 which is normally closed by a removable plate 102 and the opening 101 is covered by a series of wire mesh screens 103 held in place by a suitable frame 104. The screens 103 allow the passage of the back-drafting air but are fine enough to prevent the passage of appreciable quantities of dust therethrough.

When it is desired to back-draft the receptacle 20 the dampers 17, 18, 86, 96 and 98 are closed the dampers 88 and 89 and the doors 91 are opened and the plate 102 is removed, so that air from the fan 15 now flows through the conduits 87 and 85 into the top of the compartment D and passing through the wire mesh screens 71 and the baffle screens of the group T removes any adhering particles of dust therefrom and blows it into the top of the compartment C. Since the damper 96 is closed and the doors 92 are open the major portion of this back-drafting air together with the dust it has removed flows into the device 52 and through its openings 91 into the compartments C' and the remaining portion of the air and dust is blown through the slots 63 into the space between the baffle plate devices 52 and 51 and because the damper 98 is closed, this air dust is also directed by the baffle plates of the devices 52 and 51 into the compartments C'. Upon leaving the compartments C' the air and dust are directed by the baffle device 51 into the lower portions of the compartment C and through the baffle screens M to remove adhering dust therefrom and thence into the compartment B. Upon entering the compartment B, the air and dust flow downwardly over the baffle plates 41 and 47, through and beneath the screens 48, a minor portion of the air and dust flowing between the .500 inch spaces of the baffle screen L at opposite sides of the flared lower end 58 of the conduit 57, and the major portion of the air and dusts flowing upwardly and outwardly through the space between the baffle plates 44 and 47 into the compartment B' and thence inwardly and downwardly beneath the baffle plate 44 through the right-hand portion of the baffle screens L into the compartment A. The air leaves the compartment A through the screens 103 which separate the dusts from the air stream and directs them into the receptable R from which they may be removed from time to time. From Fig. 3 it will be seen that the back-draft air is deflected away from the left-hand portions of the screens L by the baffle plate 41, the reason being that, due to the speed of the flow of dust laden gases through this portion of the screens during a normal dust separating and collection operation, dust cannot adhere to or accumulate thereon.

It will be understood that the foregoing description of the specific form of my dust separating and collecting apparatus shown in the drawings is intended to exemplify the principles of my invention and that various modifications and arrangements of the component parts of the apparatus may be made within the scope of the appended claims wherein:

I claim:

1. In a dust separating and collecting apparatus, the combination with a chamber having an inlet conduit adjacent its bottom and an outlet conduit at its top; of a plurality of ascendingly finer mesh groups of baffle screen units, each of said units comprising a plurality of inverted V-shaped elements and means for securing the elements in predeterminately spaced parallel relation one to the other, the elements of one unit being arranged to transversely cross the elements of the next adjacent unit of the same group and said groups of units being spaced and arranged to divide the chamber into a plurality of separate compartments, whereby the spaced crossed elements of each group of baffle screen units create sufficient turbulence in gases passing upwardly between the spaced elements to successively precipitate particles of dust therefrom; a series of groups of baffle plates formed and arranged in the chamber to successively deflect and direct the flowing gases first in one direction then in an opposite direction before they pass through the group of baffle screen thereabove, said baffle plates of each group cooperatively serving with the associated group of baffle screen units thereabove in precipitating particles of dust from the flowing gases, whereby substantially all of the particles of dust are separated and precipitated; and a receptacle at the bottom of the chamber for collecting the precipitated particles of dust.

2. In a dust separating and recovering apparatus as set forth in claim 1 wherein all of the dust laden gases flow through the inlet conduit and through a side opening into the compartment next above the lowermost group of baffle screen units, a baffle plate extending between the top of the opening and the top of said lowermost baffle screen units overlies and deflects all of said gases downwardly through a coarser portion of the latter into the lowermost compartment, a baffle plate in the lowermost compartment is arranged to deflect the gases thereacross and a baffle plate is arranged to deflect and reverse the flow of some of the gases and to deflect the remainder of the gases upwardly through a less coarse portion of the lowermost screens back into another separate portion of the compartment the gases first entered, whereby said baffle plates and said baffle screens cooperate in causing deflections and turbulence in the flowing gases sufficient to precipitate substantially all of the heavier particles of dust therefrom.

3. In a dust separating and recovering apparatus as set forth in claim 2 wherein dust laden gases from which heavier particles of dust have been removed in the lowermost compartment upon entering the compartment thereabove are deflected upwardly and outwardly by a first inclined baffle plate, then inwardly and dowanrdly by a second baffle plate spaced above the first baffle plate in parallel relation thereto, then upwardly and outwardly through a spaced inclined pair of wire mesh screens and then through a second group of finer baffle screen units into a compartment thereabove, whereby said first and second baffle plates, said wire mesh screen units and said baffle screen cooperate in causing deflections and turbulence in the flowing gases sufficient to precipitate substantially all of the medium heavy particles of dust therefrom.

4. In a dust separating and collecting apparatus as set forth in claim 1 wherein one of said compartments defined by spaced upper and lower groups of baffle screen units is provided with a spaced inverted pair of truncated pyramidally-shaped baffle plate devices, the lower of said devices serving to deflect upwardly flowing gases and dusts outwardly and the upper of said devices serving to deflect said gases and dust downwardly and inwardly between said devices and toward their open truncated ends; a narrow slot is formed in each baffle plate of the upper device intermediate and parallel to its upper and lower edges; an upwardly opening hood is secured to the inner side of each baffle plate to overlie and direct fine dusts collected therein downwardly into and through the slot; a similar downwardly opening hood is secured to the outer side of each of said baffle plates to underlie and direct such dusts downwardly away from the slot and into the gases flowing downwardly between the baffle devices, such gases in flowing over the downwardly opening hood inducing the flow of said dusts; a downdraft conduit is connected to the open end of the lower baffle device and extends downwardly through the lower group of baffle screen units and the adjacent lower compartment to a central portion of a group of screen units located at the bottom of said adjacent compartment, whereby lighter particles of dusts precipitated into the upper device by the upper group of baffle screen units and by said devices are caused to flow downwardly through said devices and the down-draft conduit.

5. In a dust separating and collecting apparatus as set forth in claim 4 wherein the sides of each of the upwardly opening hoods are extended to the outer corners of the upper baffle plate device and arranged to direct dusts into the hoods.

6. In a dust separating and collecting apparatus as set forth in claim 4 wherein a compartment above the upper group of baffle screen units is provided with a movable frame and a fixed frame; a series of ascendingly finer mesh wire screens are secured in the movable frame, and means operable to gradually raise then drop the movable frame upon the fixed frame are operably connected to the movable frame, whereby operation of said means produces vibrations which cause precipitation of particles of dust from the wire and the baffle plate screens thereby preventing blinding of the screens.

7. In a dust separating and collecting apparatus as set forth in claim 4 wherein each baffle plate of the upper device is provided with a door movable to close and open an opening therein, means are operably connected to each door to hold it normally closed or open; the truncated end of the upper device is provided with a normally open damper operable to close said end, and the conduit is provided with a normally open damper operable to close said conduit, whereby upon opening the doors and closing the dampers and upon forcing clean air downwardly into the chamber said air flowing downwardly through the upper baffle screens is deflected by said device upwardly and outwardly over the upwardly opening hood to induce a reverse flow of dusts through the hoods and slots and is then deflected downwardly and inwardly beneath the lower device and through the lower baffle screen units to remove adhering particles of dust from the surfaces of these elements.

8. In a dust separating and collecting device as set forth in claim 1 wherein the lowermost compartment is provided with an opening covered by a series of fine mesh wire screens, said opening being normally closed by a removable plate, whereby upon removing the plate and forcing clean air into the outlet conduit air flows downwardly through the groups of screens, in tortuous paths around the baffle plates and out through the screened opening, thereby removing from said elements adhering particles of dust which fall into the receptacle.

9. A baffle screen unit for dust separating and collecting apparatus comprising a plurality of sections of V-shaped baffle elements, the sides of said elements intermediate their terminal end portions being relieved to provide predetermined spaces therebetween when the terminal portions are secured in abutting side-by-side relation one to the other, and plate means spanning and rigidly secured to the outer ends of the elements, thereby forming a rigid unitary baffle screen, whereby when said screen is mounted with said elements inverted and dust laden gases are forced upwardly through said spaces the elements create a turbulence which separates and precipitates particles of dust from the flowing gases.

10. A plurality of the baffle screen units as set forth in claim 9 wherein the units are compactly stacked one on the other with the baffle elements and the spaces of one unit lying transversely across the baffle elements and the spaces of an adjacent unit, whereby the total turbulence of gases flowing through the thus stacked plurality of units is greater than the sum of the turbulence of the same number of units used individually and their dust separating and precipitating capacity is increased.

References Cited in the file of this patent

UNITED STATES PATENTS

| | | |
|---|---|---|
| 640,796 | Neuhs | Jan. 9, 1900 |
| 972,534 | Hickey | Oct. 11, 1910 |

FOREIGN PATENTS

| | | |
|---|---|---|
| 2,310 | Great Britain | June 11, 1879 |
| 121,024 | Germany | June 13, 1901 |
| 209,315 | Germany | Apr. 29, 1909 |
| 282,268 | Germany | Feb. 20, 1915 |
| 1,009,971 | France | Mar. 12, 1952 |